(12) United States Patent
Lorenz et al.

(10) Patent No.: US 9,844,754 B2
(45) Date of Patent: Dec. 19, 2017

(54) AFTERTREATMENT SYSTEM WITH ACCESS PANEL

(71) Applicant: Cummins Emission Solutions Inc., Columbus, IN (US)

(72) Inventors: Tyler K. Lorenz, McFarland, WI (US); Vipin Iyer, Stoughton, WI (US); Jason D. Meier, Fitchburg, WI (US)

(73) Assignee: Cummins Emission Solutions Inc., Columbus, IN (US)

(*) Notice: Subject to any disclaimer, the term of this patent is extended or adjusted under 35 U.S.C. 154(b) by 248 days.

(21) Appl. No.: 14/744,972

(22) Filed: Jun. 19, 2015

(65) Prior Publication Data
US 2016/0367940 A1 Dec. 22, 2016

(51) Int. Cl.
*B01D 53/94* (2006.01)
*F01N 3/20* (2006.01)
*F01N 13/18* (2010.01)

(52) U.S. Cl.
CPC ....... *B01D 53/9431* (2013.01); *F01N 3/2066* (2013.01); *F01N 13/18* (2013.01); *F01N 13/1855* (2013.01); *B01D 2251/2067* (2013.01); *B01D 2258/012* (2013.01); *F01N 2610/1453* (2013.01); *Y02T 10/24* (2013.01)

(58) Field of Classification Search
None
See application file for complete search history.

(56) References Cited

U.S. PATENT DOCUMENTS

| 8,062,602 | B2 | 11/2011 | Roe et al. | |
|---|---|---|---|---|
| 2008/0295500 | A1* | 12/2008 | Cox | F01N 3/0256 60/295 |
| 2009/0000605 | A1* | 1/2009 | Craig | F01N 3/0253 123/549 |
| 2014/0044612 | A1 | 2/2014 | Baig et al. | |

* cited by examiner

*Primary Examiner* — Walter D Griffin
*Assistant Examiner* — Jelitza Perez
(74) *Attorney, Agent, or Firm* — Foley & Lardner LLP

(57) ABSTRACT

An aftertreatment system comprises a housing having an inlet, an outlet and a sidewall. The housing defines an internal volume structured to receive an exhaust gas via the inlet. The sidewall defines an access opening. An access panel is operatively coupled to the sidewall and covers the access opening. The access panel defines a plurality of throughholes. Each of the plurality of throughholes are configured to receive a fastener therethrough for removably coupling the access panel to the sidewall. An injection port is also defined in the access panel. An injector is positioned on the access panel. The injector is removably coupled to the access panel via a coupling assembly so that the injector is in fluidic communication with the internal volume via the injection port. A SCR system is disposed in the internal volume and includes at least one catalyst formulated to decompose constituents of the exhaust gas.

23 Claims, 5 Drawing Sheets

AFTERTREATMENT SYSTEM WITH ACCESS PANEL

TECHNICAL FIELD

The present disclosure relates generally to exhaust aftertreatment systems for use with internal combustion (IC) engines.

BACKGROUND

Exhaust aftertreatment systems are used to receive and treat exhaust gas generated by engines (e.g., IC engines). Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) system to convert NOx (NO and $NO_2$ in some fraction) into harmless nitrogen gas ($N_2$) and water vapor ($H_2O$) in the presence of ammonia ($NH_3$). Generally in such conventional aftertreatment systems, a reductant, (e.g., a diesel exhaust fluid such as urea) is injected into the aftertreatment system. The reductant is allowed to mix with the exhaust gas and facilitates decomposition of constituents of the exhaust gas by a catalyst included in the SCR system.

Conventional aftertreatment systems include an injector configured to insert the reductant into the aftertreatment system. The reductant can deposit on inner surfaces of the sidewall of a housing of the aftertreatment system which can increase exhaust gas backpressures, clog nozzles and/or components of the exhaust system and eventually lead to reduction in a catalytic conversion efficiency of the aftertreatment system. Furthermore, particulate matter such as soot, carbon particles and debris can also deposit on the inner surface of the sidewalls of the housing.

SUMMARY

Embodiments described herein relate generally to housings for aftertreatment systems, and in particular to housings that define an access panel on a sidewall of the housing to allow access to an inner volume of the housing for inspection and cleaning. In various embodiments, an access panel is operatively coupled to the sidewall to cover the access opening and configured to mount an injector on the sidewall of the housing.

In a first set of embodiments, an aftertreatment system comprises a housing having an inlet, an outlet and a sidewall. The housing defines an internal volume structured to receive an exhaust gas via the inlet. The sidewall defines an access opening. An access panel is operatively coupled to the sidewall and covers the access opening. The access panel defines a plurality of throughholes. Each of the plurality of throughholes are configured to receive a fastener therethrough for removably coupling the access panel to the sidewall. An injection port is also defined in the access panel. An injector is positioned on the access panel. The injector is removably coupled to the access panel via a coupling assembly so that the injector is in fluidic communication with the internal volume via the injection port. A SCR system is disposed in the internal volume and includes at least one catalyst formulated to decompose constituents of the exhaust gas.

In another set of embodiments, a housing for an aftertreatment system comprises an inlet structured to receive an exhaust gas. An internal volume is defined by the housing and structured to house a SCR system. At least a portion of the internal volume is structured to allow mixing of a reductant with the exhaust gas to form a mixture and communicate the mixture to the SCR system. A sidewall of the housing defines a recess which includes a base. The base defines an access opening. An access panel is operatively coupled to the base and covers the access opening. The access panel defines a plurality of throughholes. Each of the plurality of throughholes is configured to receive a fastener therethrough for removably coupling the access panel to the sidewall. An injection port is also defined in the access panel. The housing includes an outlet structured to expel the exhaust gas out of the housing.

In yet another set of embodiments, an apparatus for decomposing constituents of an exhaust gas comprises a housing having an inlet, an outlet and a sidewall. The housing defines an internal volume structured to receive an exhaust gas via the inlet. The sidewall defines an access opening. An access panel is operatively coupled to the sidewall and covers the access opening. The access panel includes a first portion and a second portion. The first portion defines a periphery of the access panel. At least a portion of the first portion is positioned on the sidewall around a rim of the access opening. A plurality of throughholes are defined in the first portion. Each of the plurality of throughholes are configured to receive a fastener therethrough for removably coupling the access panel to the sidewall. The second portion is positioned within the first portion and is offset from the first portion so as to define a cavity. The second portion is positioned within the access opening and defines an injection port. A catalyst assembly is positioned within the internal volume. The catalyst assembly includes at least one catalyst configured to decompose constituents of the exhaust gas. Furthermore, the housing includes an outlet structured to expel the treated exhaust gas out of the housing.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
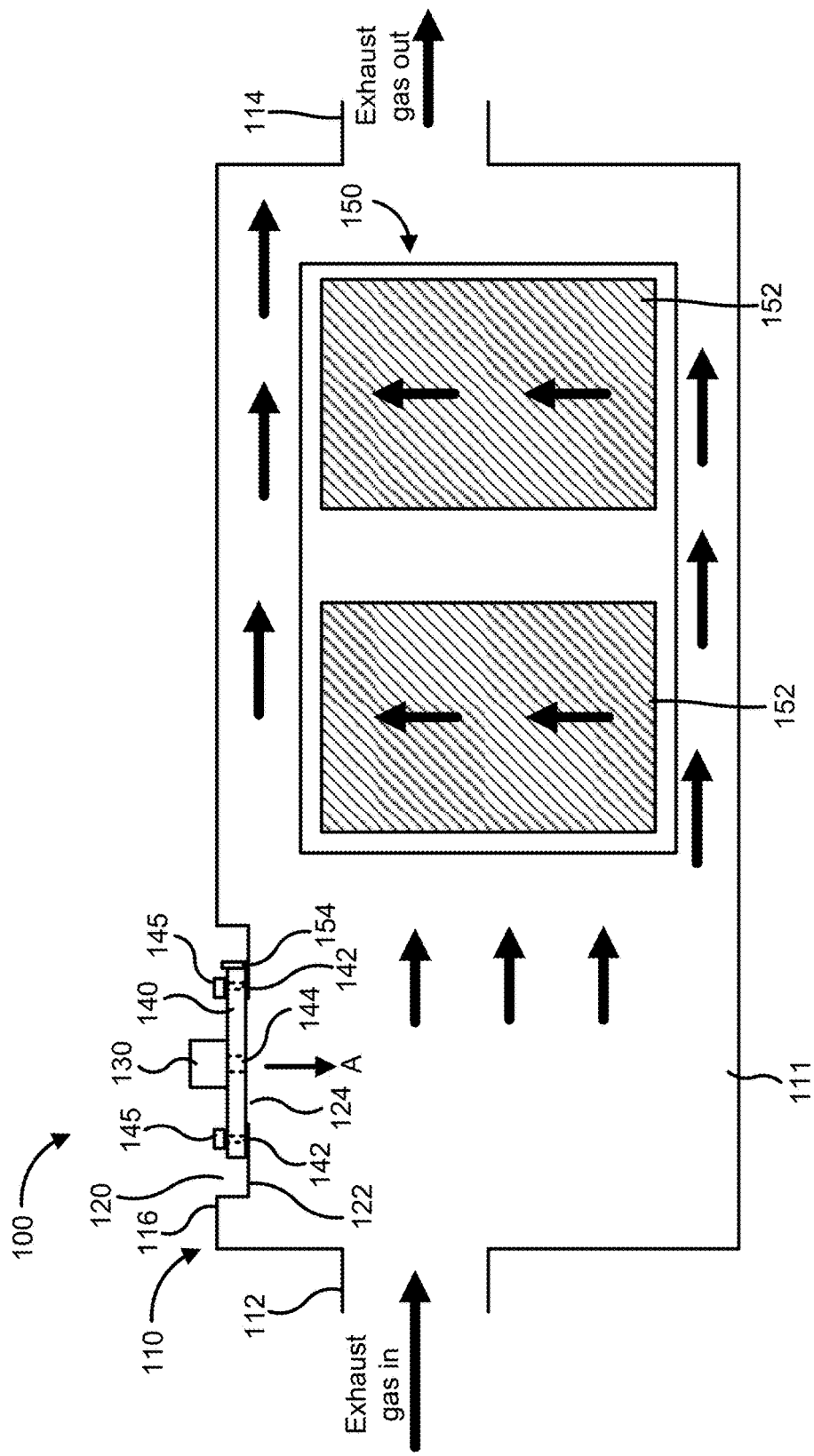
FIG. 1 is a schematic illustration of an aftertreatment system including an access panel, according to an embodiment.
Figure 2:
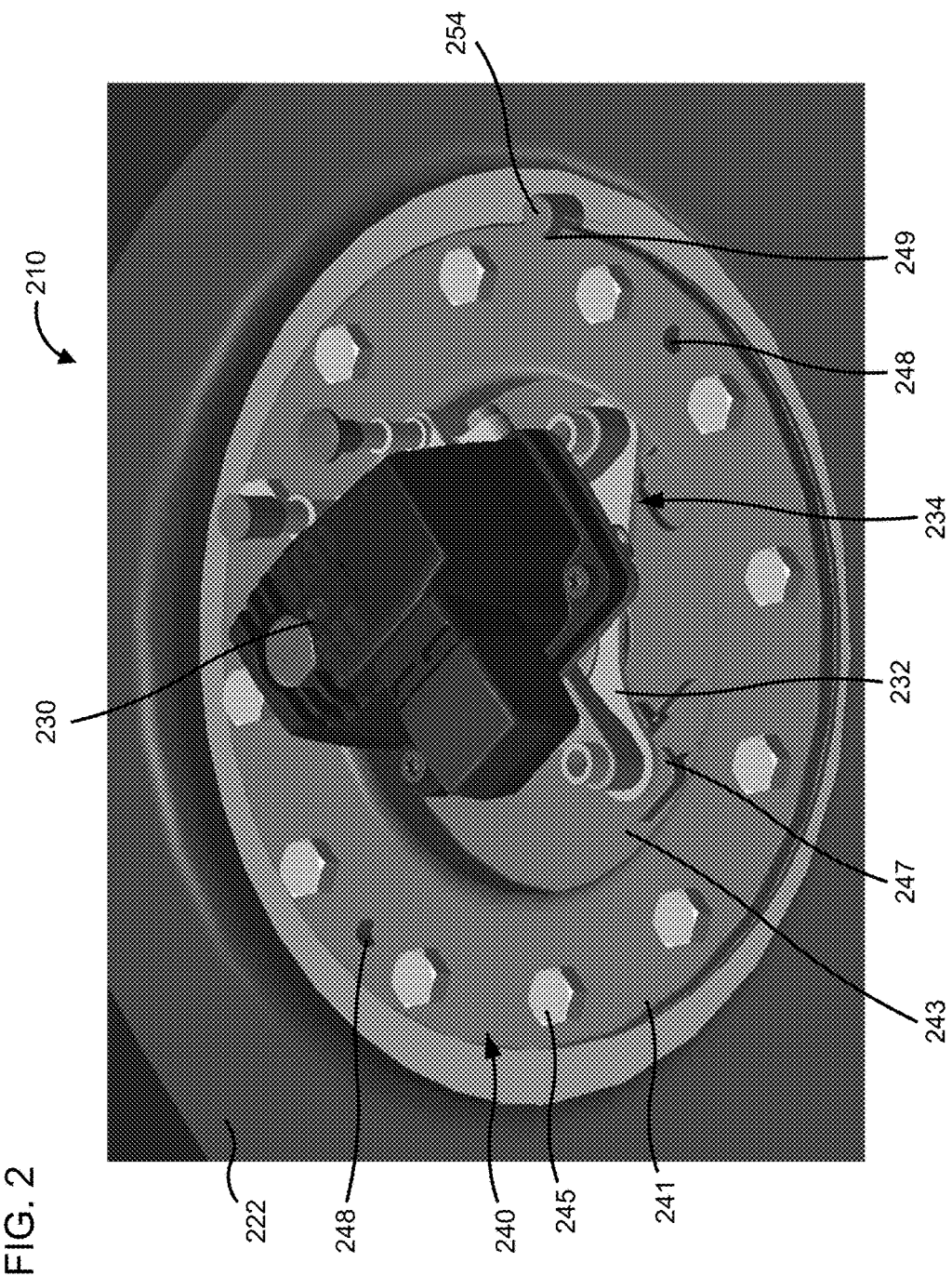
FIG. 2 is perspective view of a portion of another embodiment of a housing of an aftertreatment system showing an access panel with an injector mounted thereon, covering an access opening defined on a sidewall of the housing.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to housings for aftertreatment systems, and in particular to housings that define an access panel on a sidewall of the housing to allow access to an inner volume of the housing for inspection and cleaning. In various embodiments, an access panel is operatively coupled to the sidewall to cover the access opening and configured to mount an injector on the sidewall of the housing.

Embodiments of the housing of an aftertreatment described herein that include an access opening and access panel may provide benefits including, for example: (1) allowing access to inner surfaces of the housing to enable cleaning and removal of debris, soot and reductant deposits; (2) allowing inspection of any damage to a catalyst positioned within an internal volume of the housing or blockage of exhaust gas flow; (3) mounting an injector on an access panel covering the access opening to allow removal or replacement of injector as well as inspection of injector mounting surface; (4) providing injector mounting and access to internal volume of the housing at a single location, thereby reducing space requirements and accessibility; (5) providing threaded apertures on the access panel within which jacking bolts can be removably inserted thereby facilitating removal of the access panel and/or positioning of the access panel on the sidewall to cover the access opening; and (7) providing a notch in the access panel which aligns with a pin positioned on the surface, thereby providing poke-yoke and preventing misalignment of the access panel on the sidewall of the housing.

FIG. 1 shows a schematic illustration of an aftertreatment system 100, according to an embodiment. The aftertreatment system 100 includes a housing 110 that includes an access opening 124 defined on a sidewall 116 of the housing 110, an access panel 140, an injector 130 and an SCR system 150.

The housing 110 defines an internal volume 111 within which the SCR system 150 is positioned. The housing 110 can be formed from a rigid, heat resistant, and/or corrosion resistant material. Suitable materials can include without limitation metals (e.g., stainless steel, iron, aluminum, alloys, etc.), ceramics, any other suitable material or a combination thereof. The housing 110 can define a circular, square, rectangular, polygonal, oval, or any other suitable cross section. Furthermore, the length of the housing 110 along the flow direction of the exhaust gas can be varied to increase or decrease the residence time of the exhaust gas within the housing 110.

The housing 110 includes an inlet 112 and an outlet 114. The inlet 112 is structured to receive an exhaust gas (e.g., a diesel exhaust gas) from an engine such as an IC engine (e.g., a diesel IC engine). For example, the inlet 112 can be fixedly or removably coupled to an exhaust manifold or pipe of the engine to receive the exhaust gas. The outlet 114 is structured to expel the exhaust gas into the environment after the exhaust gas has been treated by the SCR system 150, as described herein.

The SCR system 150 is disposed in the internal volume 111 and is structured to decompose constituents of the exhaust gas, for example NOx gases included in the exhaust gas. In particular embodiments, a reductant (e.g., a diesel exhaust fluid such as an aqueous urea solution) can be inserted into the housing 110 which mixes with the exhaust gas and provides a source of ammonia to facilitate decomposition of the constituents of the exhaust gas (e.g., a diesel exhaust gas). The SCR system 150 includes at least one catalyst 152 formulated to decompose the constituents of the exhaust gas.

The catalysts 152 can include any suitable catalyst such as, for example, platinum, palladium, rhodium, cerium, iron, manganese, copper, vanadium based catalyst, any other suitable catalyst, or a combination thereof. The catalysts 152 can be disposed on a suitable substrate such as, for example, a ceramic (e.g., cordierite) or metallic (e.g., kanthal) monolith core which can, for example, define a honeycomb structure. A washcoat can also be used as a carrier material for the catalysts 152. Such washcoat materials can include, for example, aluminum oxide, titanium dioxide, silicon dioxide, any other suitable washcoat material, or a combination thereof. The exhaust gas (e.g., diesel exhaust gas) flows over and about the catalysts 152 such that any NOx gases included in the exhaust gas are further reduced to yield an exhaust gas which is substantially free of NOx gases.

The sidewall 116 of the housing 110 defines an access opening 124 as shown in FIG. 1. The access opening 124 can be positioned proximal to the inlet 112 of the housing 110. The access opening 124 is configured to facilitate inspection and/or cleaning of inner surfaces of the housing 110 and/or components positioned within the internal volume 111 defined by the housing 110. The access opening 124 can possess a cross-section sufficient to allow access to at least a portion of the internal volume 111 of the housing 110 for inspection and cleaning. However, the cross-section of the access opening 124 is insufficient to allow removal of the SCR system 150, catalyst 152 or catalyst assembly from the internal volume 111 of the housing 110. In this manner, the access opening 124 provides quick and easy access to the internal volume 111 without uninstalling or otherwise disassembling the housing 110 or otherwise the aftertreatment system 100. The access opening 124 can have any suitable cross-section such as circular, square, rectangular, elliptical or polygonal.

An access panel 140 is operatively coupled to the sidewall 116 of the housing 110 and covers the access opening 124. A plurality of throughholes 142 are defined in the access panel 124. In some embodiments, the throughholes 142 can be positioned along a periphery of the access panel 140 at any suitable radial pitch. Each of the plurality of throughholes 142 is configured to receive a fastener 145 (e.g., a screw, a bolt, a rivet, a pin, a dowel, etc.) therethrough for removably coupling the access panel 140 to the sidewall 116. For example, mating openings (e.g., threaded mating openings) can be defined on the sidewall 116 of the housing 110 and configured to removably receive at least a portion of the fasteners 145 inserted through the throughholes 142 to allow removable coupling of the access panel 140 the sidewall 116 of the housing 110. The access panel 140 can be formed from any suitable material, for example metals (e.g., stainless steel, iron, aluminum, alloys, etc.).

At least a portion of the access panel 140, for example a peripheral portion of the access panel 140 overlaps, is placed contiguous to, or otherwise abuts a portion of the sidewall 116 about a rim of the access opening 124, when the access panel 140 is installed on the sidewall 116 and is in a closed position, for example when coupled to the sidewall 116 via the plurality of fasteners 145. A sealing member (not shown), for example a gasket or an O-ring can be positioned between the sidewall 116 (e.g., positioned surrounding the rim of the access panel 140) and the portion of the access panel, to seal the access opening 124 and prevent the exhaust gas from exiting the internal volume 111 of the housing 110 via the access opening 124 (i.e. from the mating surfaces of the sidewall 116 and the access panel 140). The access panel 140 can include a flat mating surface, for example a machined surface to ensure a flat sealing surface with the sealing member to minimize leakage of the exhaust gas. Other sealing surface profiles (e.g., conical or tapered fits) or surface finishes may alternatively be used.

The access panel 140 also defines an injection port 144 configured to be positioned over the access opening 124. The injection port 144 provides a flow path through the access panel 140 and the access opening 124 to the internal volume 111 of the housing 110. An injector 130 is positioned on the access panel 140 on a surface of the access panel 140 distal to the access opening 124. The injector 130 can be included in a reductant insertion assembly (not shown) which can include a reductant storage tank, pumps, valves, nozzles, etc. The injector 130 is configured to insert a reductant (e.g., a diesel exhaust fluid such as an aqueous urea solution) into the internal volume 111.

For example, as shown in FIG. 1, the access opening 124 is defined and therefore the access panel 140 is positioned such that the injection port 144 is in fluidic communication with a portion of the internal volume 111 positioned upstream of the SCR system 150. A nozzle of the injector 130 can be positioned within or through the injection port 144 such that the injector 130 inserts the reductant into the exhaust gas upstream of the SCR system 150, when the access panel 140 is installed on the sidewall 116 and is in a closed position, for example when coupled to the sidewall 116 via the plurality of fasteners 145. The reductant can at least partially decompose the constituents of the exhaust gas or generate ammonia which is mixed with the exhaust gas before the exhaust gas enters the SCR system 150. The reductant or ammonia facilitates decomposition of the constituents of the exhaust gas by the catalyst 152 or otherwise the catalyst assembly included in the SCR system 150.

The injector 130 can be removably coupled to the access panel 140 using a coupling assembly (not shown) coupled to the injector 130. Coupling of the injector 130 to the access panel 140 places the injector 130 in fluid communication with the internal volume 111 via the injection port 144. In particular embodiments, a plurality of alignment features (not shown) are defined on a surface of the access panel 140 distal to the access opening 124. The plurality of alignment features are configured to allow alignment and coupling of the injector 130 to the access panel 140 via a bracket which can be included in the coupling assembly coupled to the injector.

FIG. 1 shows only one injector 130 positioned on the access panel 140. In other embodiments, the access panel 140 can be sized and shaped to accommodate a plurality of injectors (e.g., 2, 3, 4 or even more) injectors thereon. In this manner, a plurality of injectors can be positioned on the access panel 140 and coupled thereto, for example using a plurality of the coupling assemblies. In such embodiments, the access panel 140 can define a plurality of injection ports to allow each of the plurality of injectors to insert the reductant into the internal volume 111 via at least one of the plurality of injection ports.

In some embodiments, the access panel 140 also defines a pair of threaded apertures (not shown) therein. The pair of threaded apertures are positioned opposite to each other along a periphery of the access panel 140. The threaded apertures can be defined using tapping or drilling and are different from the throughholes 142, for example have a small or larger diameter, are defined only partially through the access panel 140, and/or are positioned at a different radial pitch relative to the plurality of throughholes 142. In such embodiments, the aftertreatment system 100 can also include a plurality of jacking bolts (not shown) removably threaded into the threaded apertures. The jacking bolts can have a length substantially longer than a thickness of the access panel 140, for example greater than 5 times the thickness of the access panel 140. The jacking bolts can be threaded into the threaded apertures such that a substantial length of the jacking bolts (e.g., greater than ⅔ of the length of the jacking bolts) extends from the access panel 140 away from the sidewall 116. The jacking bolts can easily be gripped or access by service personnel or a user thereby, facilitating removal of the access panel 140 from the sidewall 116.

In still other embodiments, the housing 110 also includes a pin 154 positioned on the sidewall 116 of the housing 110. As shown in FIG. 1, the pin is positioned proximal to the access opening 124 and extends orthogonally from the sidewall 116. In such embodiments, a notch (not shown) is defined along the periphery of the access panel 140. The notch is aligned with the pin 154 so as to prevent misalignment of the access panel 124 and ensure proper orientation of the access panel 140 on the sidewall of the housing 110. For example, the notch can be positioned adjacent to the pin 154 (e.g., proximal but not touching, in line with or a portion of the pin inserted into the notch) to properly align the access panel 140.

In particular embodiments, the sidewall 116 defines a recess 120 including a base 122 such that the access opening 124 is defined in the base 122. In such embodiments, the access panel 140 is operatively coupled to the base 122 so that at least a portion of the access panel 140 is positioned in the recess 120. Furthermore, at least a portion of the injector 130 can also be positioned within the recess 120. In one embodiment, a depth of the recess 120 is defined so that substantially all of the injector 130 is positioned within the recess 120. The jacking bolts described before herein are particularly suitable for facilitating removal of the access panel 140 from the recess 120. The recess 120 can be formed using any suitable process. For example, the housing 110 can be a cast, molded or stamped housing, and the recess 120 can be formed monolithically with the housing 110.

In yet another embodiment, the access panel 140 includes a first portion defining a periphery of the access panel 140 so that the plurality of threaded throughholes 142 are defined in the first portion. Furthermore, the threaded apertures can also be defined in the first portion. At least a portion of the first portion is positioned on sidewall 116 of the housing 110, i.e. about a rim of the access opening 124.

Furthermore, the access panel 140 also includes a second portion positioned within the first portion and is offset from the first portion to define a cavity. The injection port 144 is defined in the second portion. Moreover, the alignment features are defined in the cavity defined by the second portion. The second portion is positioned within the access opening 124. In other words, the second portion can seat in the access opening 124. The second portion alone or in combination with the notch and pin described before herein provide poke-yoke to prevent misalignment of the access panel 140 on the housing 110.

As shown in FIG. 1, the SCR system 150 is disposed downstream of the access opening 124. This allows the exhaust gas and the reductant inserted into the internal volume 111 to mix sufficiently in a portion of the internal volume upstream of the SCR system 150 before entering the SCR system 150. In particular embodiments, the internal volume 111 can be divided into a plurality of portions. For example, the internal volume 111 can be divided into an internal volume first portion proximal to the access opening 124 (e.g., defining a decomposition chamber), and an internal volume second portion downstream of the access opening 124 within which the SCR system 150 can be disposed. The internal volume first portion and the internal volume second portion can be divided by a partition which can define an opening, a channel or a passageway so as to allow the exhaust gas and reductant mixture to flow from the internal volume first portion into the internal volume second portion. The internal volume first portion can be structured to allow the exhaust gas to sufficiently mix with the reductant to form a mixture which is then communicated to the SCR system 150 positioned in the internal volume second portion.

In other embodiments, the aftertreatment system 100 can also include additional components positioned within the internal volume 111 of the housing. Such components can include, for example, a filter, a mixer and/or an oxidation catalyst (e.g., a diesel oxidation catalyst and/or an ammonia oxidation catalyst) configured to facilitate treatment of the exhaust gas. Each of these components can be disposed in the internal volume 111 and fluidly coupled to the SCR system 150. For example, the filter can be disposed upstream of the SCR system 150 and can include any suitable filter (e.g., a diesel particulate filter or a selective catalyzed reduction filter) configured to filter and remove any particulates entrained within the exhaust gas flow to prevent such particulates from entering the SCR system 150. Such particles can include, for example, dust, soot, organic particles, crystals, or any other solid particulates present in the exhaust gas.

FIGS. 2-5 show various view of a portion of another embodiment of a housing 210 of an aftertreatment system (e.g., the aftertreatment system 100). The housing 210 includes a sidewall 216 defining a recess 220, an access opening 224 and an access panel 240 operatively coupled to the sidewall 216 as described herein.

The housing 210 includes an inlet 212, an outlet (not shown) and defines an internal volume. The inlet 212 is structured to receive an exhaust gas (e.g., a diesel exhaust gas) from an engine such as an IC engine (e.g., a diesel IC engine). For example, the inlet 212 can be fixedly or removably coupled to an exhaust manifold or pipe of an engine (e.g., diesel engine) to receive the exhaust gas. The housing 210 defines an internal volume structured to receive the exhaust gas via the inlet. The outlet is structured to expel the exhaust gas into the environment after the exhaust gas has been treated by an SCR system (e.g., the SCR system 150) which can positioned within the internal volume of the housing 210 downstream of the inlet. At least a portion of the internal volume can be structured to allow mixing of a reductant inserted into the internal volume (e.g., by the injector 230) with the exhaust gas to form a mixture and communicate the mixture to the SCR system.

Figure 3:
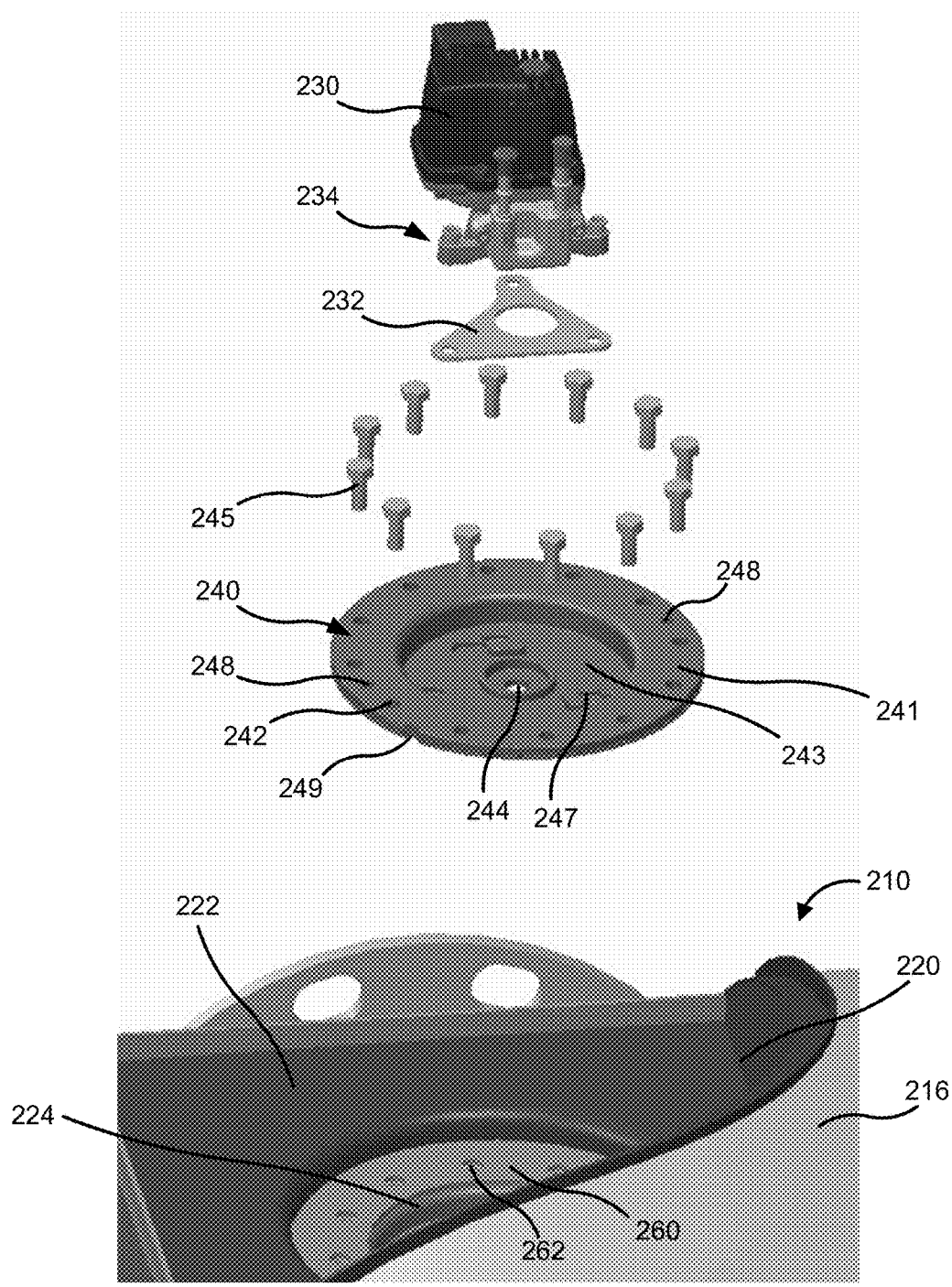
FIG. 3 is an exploded view showing the access panel removed from the sidewall of the housing to reveal the access opening.
Figure 4:
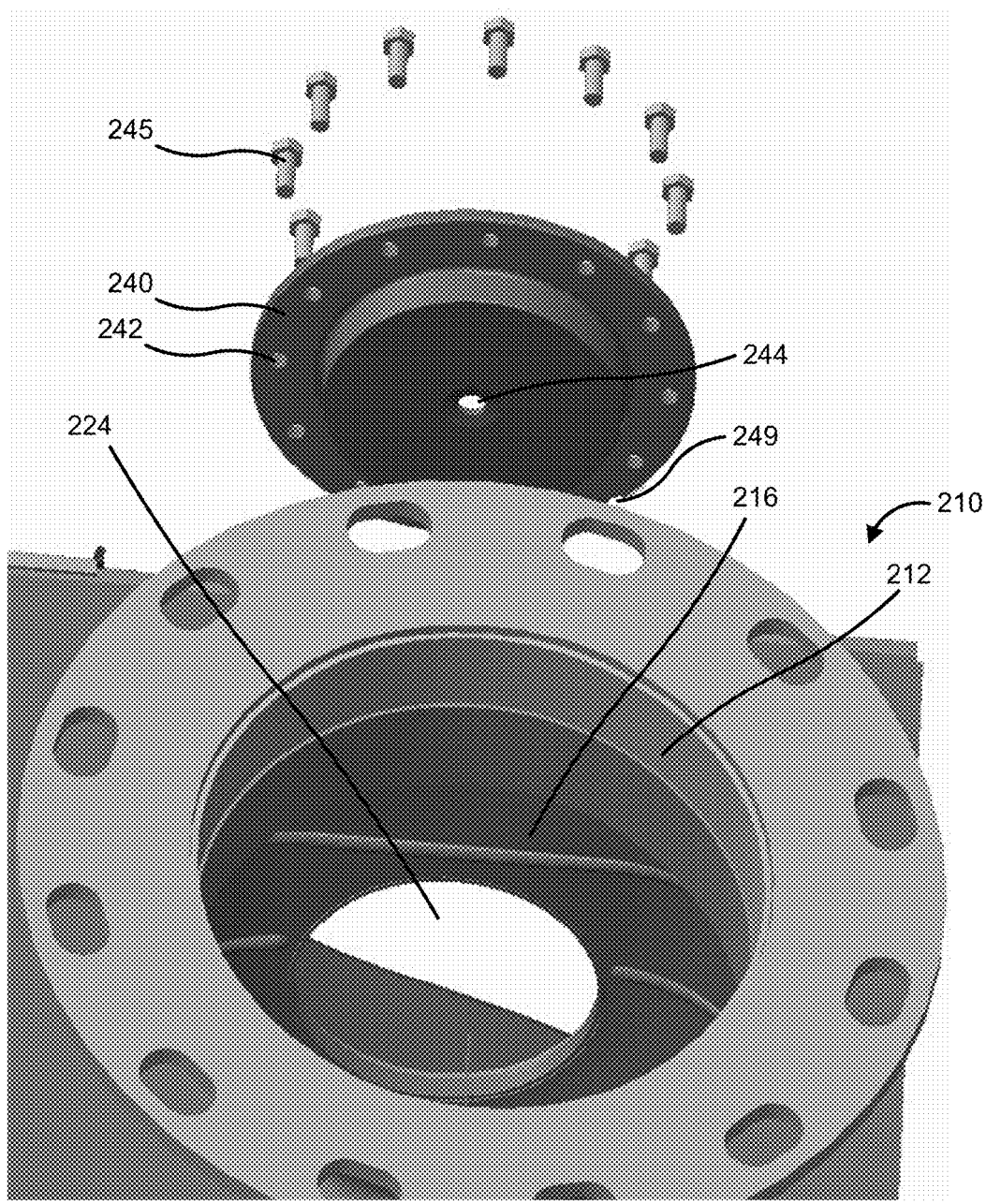
FIG. 4 is another view of the access panel removed from the sidewall of the housing so that the access opening is visible through an inlet of the housing.
Figure 5:
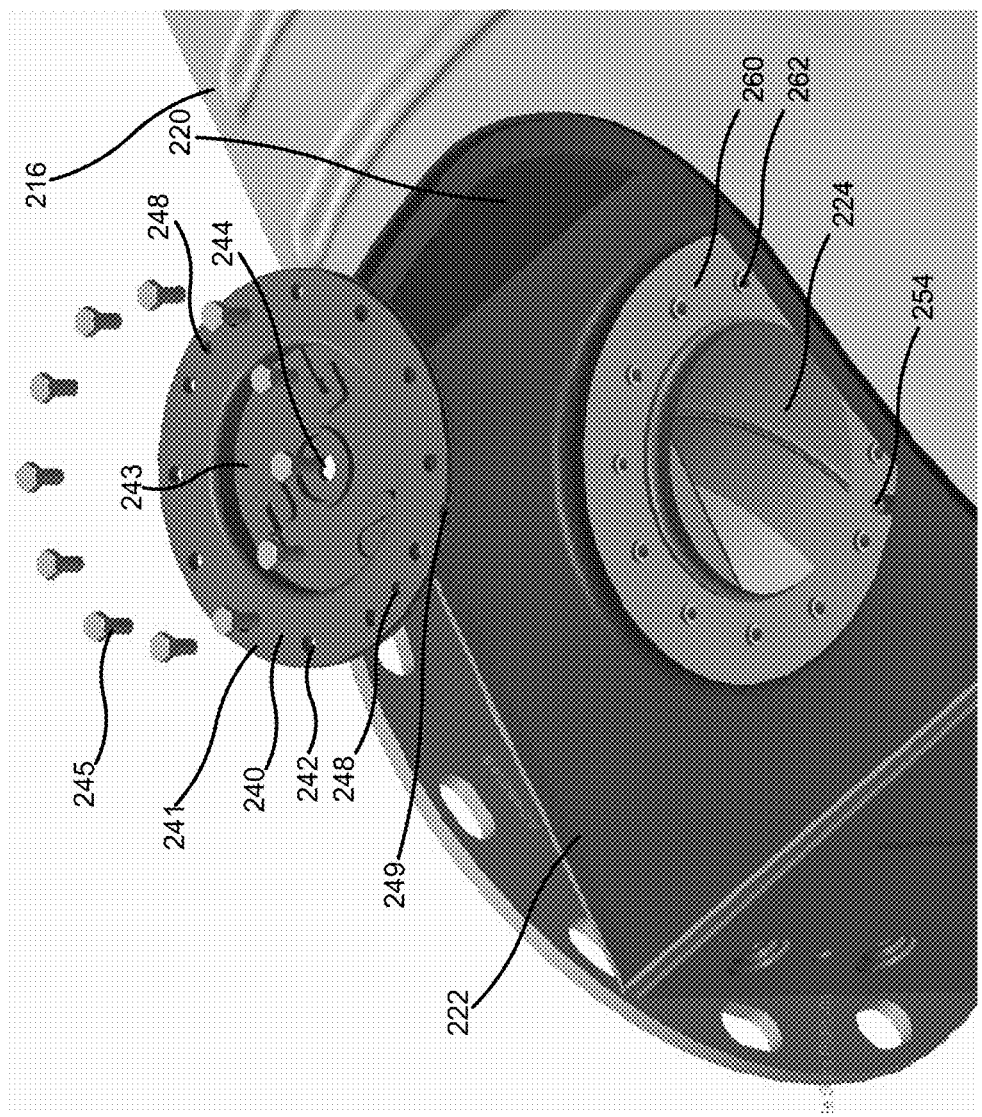
FIG. 5 is another view the access panel removed from the housing to show a recess including a base which defines the access opening.

The sidewall 216 of the housing 210 defines the recess 220. The recess 220 includes a base 222 defining the access opening 224. As shown in FIGS. 3 and 5, the recess 220 is defined at a corner of the sidewall 216 of the housing 210 proximal to the inlet 212. In other embodiments, the recess 220 can be defined at any location on the sidewall 216 proximal to the inlet 212, for example positioned along a longitudinal axis of the housing 210 proximal to the inlet 212. The recess 220 can be formed using any suitable process. For example, the housing 210 can be a cast, molded or stamped housing, and the recess 220 can be formed monolithically with the housing 110. In other embodiments, a cavity can be defined on the sidewall 216 and then the recess 220 formed separately can be positioned within the cavity and coupled to the sidewall 216 (e.g., screwed, bolted, riveted, welded, glued, etc.). Additionally, the sidewall 216 may include an internal or external insulation blanket.

The access opening 224 is defined in the base 222 and thereby, positioned proximal to the inlet 212 of the housing 210. The access opening 224 is configured to facilitate inspection and/or cleaning of inner surfaces of the housing 210 and/or components positioned within the internal volume defined by the housing 210. The access opening 224 defines a circular cross-section or diameter which is sufficient to allow access to at least a portion of the internal volume of the housing 210 for inspection and cleaning. However, the cross-section of the access opening 224 is insufficient to allow removal of an SCR system (e.g., the SCR system 150), a catalyst (e.g., the catalyst 152) or catalyst assembly positioned within the internal volume of the housing 210. Thus, the access opening 224 serves to provides quick and easy access to the internal volume without uninstalling or otherwise disassembling the housing 210 to enable inspection and cleaning of the internal volume. In various embodiments, the access opening 224 can have any suitable cross-section such as square, rectangular, elliptical or polygonal.

The access panel 240 is operatively coupled to the base 222 of the recess 220 and covers the access opening 224 (e.g., is positioned over the access opening 224). The access panel 240 includes a first portion 241 and a second portion 243. The first portion 241 defines a periphery of the access panel 240. The first portion 241 defines a plurality of throughholes 242 therethrough. The plurality of throughholes 242 are positioned radially along the first portion 241 at a predetermined radial pitch. For example, as shown in FIGS. 2-5, twelve throughholes 242 are defined in the first portion 241 with a radial pitch of 30 degrees between each throughholes 242. Each of the plurality of throughholes 242 is configured to receive a fastener 245 (e.g., a screw, a bolt, a rivet, a pin, a dowel, etc.) therethrough for removably coupling the access panel 240 to the base 222 of the recess 220, thereby covering the access opening 224.

At least a portion of the first portion 241 of the access panel 240 is positioned on the base 222 of the recess around a rim of the access opening 224. In other words, the at least a portion of the first portion 241 overlaps, abuts or is contiguous with base 222 about a rim of the access opening 224, when the access panel 240 is installed on the base 222 and is in a closed position, for example when coupled to the base 222 via the plurality of fasteners 245. A circular sealing member 260 is positioned on the base 222 around the rim of the access opening 224 between the base 222 and the first portion 241 of the access panel 240. The sealing member 260 can include a gasket or o-ring and can be formed from any suitable material (e.g., rubber, silicone, polyurethane, polymers, graphite, mica, or any other suitable material). The sealing member 260 prevents exhaust gas from exiting the internal volume of the housing 210 via the access opening 224, when the access panel 240 is installed on the base 222 and is in the closed position, as described before herein.

A plurality of openings 262 are defined in the sealing member 260. The plurality of openings 262 are positioned and oriented to align with the plurality of throughholes 242 so as to allow the fasteners 245 inserted through each of the plurality of throughholes 242 access the base 222 and be removably coupled to the base 222 of the recess 220 (e.g., threaded to mating threaded bores defined in the base 222). The access panel 240 can be formed from any suitable material, for example metals (e.g., stainless steel, iron, aluminum, alloys, etc.). The access panel 240 can include a flat mating surface, for example a machined surface to provide a flat sealing surface with the sealing member 260 to minimize leakage of the exhaust gas from the access opening 224.

The first portion 241 of the access panel 240 also defines a pair of threaded apertures 248 positioned opposite to each other along a periphery of the first portion 241. The threaded apertures 248 can be defined using tapping or drilling or any other suitable methods. The threaded apertures 248 are different from the throughholes 242, for example have a small or larger diameter, are defined only partially through the access panel 140, and/or are positioned at a different pitch relative to the throughholes 242.

A plurality of jacking bolts (not shown) can be removably threaded into each of the threaded apertures 248. The jacking bolts can have a length substantially longer than a thickness of the access panel 140, for example greater than 5 times the thickness of the access panel 240. The jacking bolts can be threaded into the threaded apertures such that a substantial length of the jacking bolts (e.g., greater than ⅔ of the length of the jacking bolts) extends from the access panel 240 away from the base 222 of the recess 220. The jacking bolts can easily be gripped or access by service personnel or a user thereby, facilitating removal of the access panel 240 from the recess 220.

A notch 249 is defined along a periphery of outer rim of the first portion 241 of the access panel 240. The notch 249 is positioned to align with a pin 254 positioned on the base 222 and extending away from the base 222, when the access panel 240 is installed on the base 222. The notch 249 is aligned with the pin 254 (e.g., placed adjacent to the pin 254, contiguous with the pin 254 or positioned so that a portion of the pin 254 is positioned within the notch 249) to prevent misalignment of the access panel 240.

The second portion 243 of the access panel 240 is positioned within the first portion. An injection port 244 is defined in the second portion 243 and is configured to be positioned over the access opening 224 to provide a flow path (e.g., a reductant flow path) through the access panel 240 and the access opening 224 to the internal volume of the housing 210, when the access panel 240 is installed on the base 222 and is in the closed position, for example when coupled to the base 222 via the plurality of fasteners 245. In various embodiments, the injection port 244 may be placed at any relative position on the second portion 243 (e.g., centered, radially offset, etc.). The second portion 243 is offset from the first portion 241 so as to define a cavity. The second portion 243 is positioned within the access opening 224. In other words, the second portion 243 can seat in the access opening 224. The second portion alone 243 or in combination with the notch 249 and pin 254 described before herein provide poke-yoke or an alignment mechanism to prevent misalignment of the access panel 240 on the housing 210.

An injector 230 is configured to be positioned on the second portion 243 and fluidly coupled to the internal volume of the housing 210 via the injection port 244. The injector 230 can be included in a reductant insertion assembly (not shown) as described with respect to the aftertreatment system 100 and configured to insert a reductant into the internal volume. A plurality of alignment features 247 are defined in the cavity defined by the second portion 243. The alignment features 247 includes notches or grooves defined at predetermined locations and orientation on a base of the second portion 243. A coupling assembly 234 is coupled to the injector 230 and includes a coupling spacer gasket 232. The alignment features 247 are configured to allow alignment and coupling of the injector 230 to the second portion of the access panel 240 via the coupling spacer gasket 232 included in the coupling assembly 234. Coupling of the injector 230 to the second portion 243 of the access panel 240 places the injector 230 in fluidic communication with the internal volume via the injection portion 244. An additional gasket, o-ring, or spacer may be placed between the injector 230 nozzle and the second portion 243 to prevent exhaust leakage from internal volume of the housing 210.

The recess 220 defines a depth such that the access panel 240 and at least a portion of the injector 230 are positioned within the recess 220. In one embodiment, a depth of the recess 220 is defined so that substantially all of the injector 230 is positioned within the recess 220 elevation profile. The jacking bolts described before herein are particularly suitable for facilitating removal of the access panel 240 from the recess 220.

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

What is claimed is:

1. An aftertreatment system, comprising:
a housing having an inlet, an outlet and a sidewall, the housing defining an internal volume structured to receive an exhaust gas via the inlet, the sidewall defining an access opening;
an access panel operatively coupled to the sidewall and covering the access opening, the access panel defining:
a plurality of throughholes, each of the plurality of throughholes configured to receive a fastener therethrough for removably coupling the access panel to the sidewall, and
an injection port;
an injector positioned on the access panel, the injector removably coupled to the access panel via a coupling assembly, the injector in fluidic communication with the internal volume via the injection port; and
a selective catalytic reduction system disposed in the internal volume, the selective catalytic reduction system including at least one catalyst formulated to decompose constituents of the exhaust gas;
wherein a sealing member is positioned between the sidewall and the access panel, the sealing member preventing exhaust gas from exiting the internal volume via the access opening when the access panel is in a closed position.

2. The aftertreatment system of claim 1, wherein the sidewall defines a recess, the access opening being defined in a base of the recess, and wherein at least a portion of the access panel is positioned in the recess.

3. The aftertreatment system of claim 2, wherein at least a portion of the injector is positioned within the recess when the access panel is in a closed position.

4. The aftertreatment system of claim 1, wherein the access opening possesses a cross-section sufficient to allow access to at least a portion of the internal volume for inspecting and cleaning, the cross-section insufficient to allow removal of the catalyst from the internal volume.

5. An aftertreatment system, comprising:
a housing having an inlet, an outlet and a sidewall, the housing defining an internal volume structured to receive an exhaust gas via the inlet, the sidewall defining an access opening;
an access panel operatively coupled to the sidewall and covering the access opening, the access panel defining:
a plurality of throughholes, each of the plurality of throughholes configured to receive a fastener therethrough for removably coupling the access panel to the sidewall, and
an injection port;
an injector positioned on the access panel, the injector removably coupled to the access panel via a coupling assembly, the injector in fluidic communication with the internal volume via the injection port; and
a selective catalytic reduction system disposed in the internal volume, the selective catalytic reduction system including at least one catalyst formulated to decompose constituents of the exhaust gas;
wherein the access panel defines a pair of threaded apertures therein, the pair of threaded apertures positioned opposite to each other along a periphery of the access panel.

6. The aftertreatment system of claim 5, further comprising a plurality of jacking bolts removably threaded into the threaded apertures, the jacking bolts facilitating removal of the access panel from the sidewall.

7. An aftertreatment system, comprising:
a housing having an inlet, an outlet and a sidewall, the housing defining an internal volume structured to receive an exhaust gas via the inlet, the sidewall defining an access opening;
an access panel operatively coupled to the sidewall and covering the access opening, the access panel defining:
a plurality of throughholes, each of the plurality of throughholes configured to receive a fastener therethrough for removably coupling the access panel to the sidewall, and
an injection port;
an injector positioned on the access panel, the injector removably coupled to the access panel via a coupling assembly, the injector in fluidic communication with the internal volume via the injection port; and
a selective catalytic reduction system disposed in the internal volume, the selective catalytic reduction system including at least one catalyst formulated to decompose constituents of the exhaust gas;
wherein the housing further comprises a pin positioned on the sidewall, the pin extending orthogonally from the sidewall; and
wherein a notch is defined along the periphery of the access panel, the notch aligned with the pin so as to prevent misalignment of the access panel.

8. An aftertreatment system, comprising:
a housing having an inlet, an outlet and a sidewall, the housing defining an internal volume structured to receive an exhaust gas via the inlet, the sidewall defining an access opening;
an access panel operatively coupled to the sidewall and covering the access opening, the access panel defining:
a plurality of throughholes, each of the plurality of throughholes configured to receive a fastener therethrough for removably coupling the access panel to the sidewall, and
an injection port;
an injector positioned on the access panel, the injector removably coupled to the access panel via a coupling assembly, the injector in fluidic communication with the internal volume via the injection port; and
a selective catalytic reduction system disposed in the internal volume, the selective catalytic reduction system including at least one catalyst formulated to decompose constituents of the exhaust gas;
wherein the access panel includes:
a first portion defining a periphery of the access panel, the plurality of throughholes defined in the first portion, at least a portion of the first portion positioned on the sidewall; and
a second portion positioned within the first portion, the second portion offset from the first portion so as to define a cavity, the second portion positioned within the access opening.

9. The aftertreatment system of claim 8, wherein a plurality of alignment features are defined on the second portion of the access panel, the plurality of alignment features configured to allow alignment and coupling of a bracket of the coupling assembly coupled to the injector.

10. A housing for an aftertreatment system, comprising:
an inlet structured to receive an exhaust gas;
an internal volume defined by the housing and structured to house a selective catalytic reduction system, at least a portion of the internal volume structured to allow mixing of a reductant with the exhaust gas to form a mixture and communicate the mixture to the selective catalytic reduction system;

a sidewall of the housing defining a recess, the recess including a base defining an access opening;

an access panel operatively coupled to the base and covering the access opening, the access panel defining:

a plurality of throughholes, each of the plurality of throughholes configured to receive a fastener therethrough for removably coupling the access panel to the sidewall, and an injection port;

an outlet structured to expel the exhaust gas out of the housing; and a pin positioned on the base, the pin extending orthogonally from the base;

wherein a notch is defined along the periphery of the access panel, the notch aligned with the pin so as to prevent misalignment of the access panel.

11. A housing for an aftertreatment system, comprising:
an inlet structured to receive an exhaust gas;
an internal volume defined by the housing and structured to house a selective catalytic reduction system, at least a portion of the internal volume structured to allow mixing of a reductant with the exhaust gas to form a mixture and communicate the mixture to the selective catalytic reduction system;
a sidewall of the housing defining a recess, the recess including a base defining an access opening;
an access panel operatively coupled to the base and covering the access opening, the access panel defining:
a plurality of throughholes, each of the plurality of throughholes configured to receive a fastener therethrough for removably coupling the access panel to the sidewall, and
an injection port; and
an outlet structured to expel the exhaust gas out of the housing;
wherein a sealing member is positioned between the sidewall and the access panel, the sealing member preventing the exhaust gas from exiting the internal volume via the access opening when the access panel is in a closed position.

12. A housing for an aftertreatment system, comprising:
an inlet structured to receive an exhaust gas;
an internal volume defined by the housing and structured to house a selective catalytic reduction system, at least a portion of the internal volume structured to allow mixing of a reductant with the exhaust gas to form a mixture and communicate the mixture to the selective catalytic reduction system;
a sidewall of the housing defining a recess, the recess including a base defining an access opening;
an access panel operatively coupled to the base and covering the access opening, the access panel defining:
a plurality of throughholes, each of the plurality of throughholes configured to receive a fastener therethrough for removably coupling the access panel to the sidewall, and
an injection port; and
an outlet structured to expel the exhaust gas out of the housing;
wherein the access panel defines a pair of threaded apertures, the pair of threaded apertures positioned opposite to each other along a periphery of the access panel.

13. The housing of claim 12, further comprising a plurality of jacking bolts removably threaded into the threaded apertures, the jacking bolts facilitating removal of the access panel from the sidewall.

14. A housing for an aftertreatment system, comprising:
an inlet structured to receive an exhaust gas;
an internal volume defined by the housing and structured to house a selective catalytic reduction system, at least a portion of the internal volume structured to allow mixing of a reductant with the exhaust gas to form a mixture and communicate the mixture to the selective catalytic reduction system;
a sidewall of the housing defining a recess, the recess including a base defining an access opening;
an access panel operatively coupled to the base and covering the access opening, the access panel defining:
a plurality of throughholes, each of the plurality of throughholes configured to receive a fastener therethrough for removably coupling the access panel to the sidewall, and
an injection port; and
an outlet structured to expel the exhaust gas out of the housing;
wherein the access panel includes:
a first portion defining a periphery of the access panel, the plurality of throughholes defined in the first portion, at least a portion of the first portion positioned on the base around a rim of the access opening; and
a second portion positioned within the first portion, the second portion offset from the first portion so as to define a cavity, the second portion positioned within the access opening.

15. A housing for an aftertreatment system, comprising:
an inlet structured to receive an exhaust gas;
an internal volume defined by the housing and structured to house a selective catalytic reduction system, at least a portion of the internal volume structured to allow mixing of a reductant with the exhaust gas to form a mixture and communicate the mixture to the selective catalytic reduction system;
a sidewall of the housing defining a recess, the recess including a base defining an access opening;
an access panel operatively coupled to the base and covering the access opening, the access panel defining:
a plurality of throughholes, each of the plurality of throughholes configured to receive a fastener therethrough for removably coupling the access panel to the sidewall, and
an injection port; and
an outlet structured to expel the exhaust gas out of the housing;
wherein a plurality of alignment features are defined on the second portion of the access panel, the plurality of alignment features configured to allow alignment and coupling of an injector to the access panel via a bracket included in a coupling assembly coupled to the injector.

16. The housing of claim 15, wherein coupling of the injector to the access panel places the injector in fluidic communication with the internal volume via the injection port when the access panel is in a closed position.

17. An apparatus for decomposing constituents of an exhaust gas, comprising:
a housing having an inlet, an outlet and a sidewall, the housing defining an internal volume structured to receive an exhaust gas via the inlet, the sidewall defining an access opening;
an access panel operatively coupled to the sidewall and covering the access opening, the access panel including:

a first portion defining a periphery of the access panel, at least a portion of the first portion positioned on the sidewall around a rim of the access opening, a plurality of throughholes defined in the first portion, each of the plurality of throughholes configured to receive a fastener therethrough for removably coupling the access panel to the sidewall, and a second portion positioned within the first portion, the second portion offset from the first portion so as to define a cavity, the second portion positioned within the access opening, the second portion defining an injection port;

a catalyst assembly positioned within the internal volume, the catalyst assembly including at least one catalyst configured to decompose constituents of the exhaust gas; and an outlet structured to expel the treated exhaust gas out of the housing.

18. The apparatus of claim 17, wherein a sealing member is positioned between the sidewall and the first portion of the access panel, the sealing member preventing the exhaust gas from exiting the internal volume via the access opening when the access panel is in a closed position.

19. The apparatus of claim 17, wherein the first portion of the access panel defines a pair of threaded apertures, the pair of threaded apertures positioned opposite to each other along a periphery of the first portion.

20. The apparatus of claim 19, further comprising a plurality of jacking bolts removably threaded into the threaded apertures, the jacking bolts facilitating removal of the access panel from the sidewall.

21. The apparatus of claim 17, further comprising:

a pin positioned on the sidewall, the pin extending orthogonally from the sidewall, wherein a notch is defined along the periphery of the first portion, the notch aligned with the pin so as to prevent misalignment of the access panel.

22. The apparatus of claim 17, wherein a plurality of alignment features are defined on the second portion of the access panel, the plurality of alignment features configured to allow alignment and coupling of an injector to the second portion of the access panel via a bracket included in a coupling assembly coupled to the injector.

23. The apparatus of claim 22, wherein coupling of the injector to the access panel places the injector in fluidic communication with the internal volume via the injection port when the access panel is in a closed position.

* * * * *